3,726,796
DRILLING FLUID AND METHOD
Richard G. Schweiger, Muscatine, Iowa, assignor to Kelco Company, San Diego, Calif.
No Drawing. Continuation-in-part of application Ser. No. 815,186, Apr. 10, 1969, which is a continuation-in-part of applications Ser. No. 615,337, Feb. 13, 1967, and Ser. No. 772,814, Nov. 1, 1968, all now abandoned. This application June 3, 1971, Ser. No. 149,864
Int. Cl. C10m 1/32, 1/38
U.S. Cl. 252—8.5 M
11 Claims

ABSTRACT OF THE DISCLOSURE

Oil base drilling fluids and water-in-oil emulsion drilling fluids containing quaternary ammonium salts of cellulose sulfate having a degree of substitution of about 2 or more and a viscosity at a one-percent concentration in aqueous media in excess of 20 cps. Method for drilling wells by circulating a drilling fluid, as defined above, in contact with a subsurface formation.

---

This application is a continuation-in-part of my copending application Ser. No. 815,186, filed Apr. 10, 1969, now abandoned, which is in turn a continuation-in-part of my applications Ser. No. 615,337 filed Feb. 13, 1967, now abandoned, and Ser. No. 772,814 filed Nov. 1, 1968, now abandoned.

This invention relates to an oil base drilling fluid and a method for its use in the drilling of wells. More specifically, the invention pertains to both oil base drilling fluids, and water-in-oil emulsion drilling fluids which contain certain quaternary ammonium salts of cellulose sulfate.

Oil base drilling fluids have various advantages as compared with water-base drilling fluids which make the oil base fluids particularly suitable for selected types of drilling operations. As an example, in drilling through various water-sensitive clays, the use of a water-base drilling fluid may be impractical since the water will hydrate the clays which may in turn alter the properties of the drilling fluid. A further area where oil base drilling fluids are useful is in the drilling of wells in colder climates where the ambient temperature would be more likely to freeze a water-base drilling fluid. The use of oil base drilling fluids for drilling wells in cold climates has a secondary advantage in that the oil base fluid may be employed as a fuel following its use as a drilling fluid.

In the use of an oil base drilling fluid, the drilling fluid invariably picks up water to some extent from the formation being drilled. If an emulsifying agent is present in the oil, water picked up from the formation will convert the oil base drilling fluid to either an oil-in-water emulsion or a water-in-oil emulsion. The latter type of emulsion is called an invert emulsion and is more desirable than an oil-in-water emulsion since, with oil as the continuous phase and water as the disperse phase, the invert emulsion retains many of the desirable properties of the oil base drilling fluid. In order to employ an oil base drilling fluid, it is therefore common procedure to add various ingredients to the oil such that the drilling fluid may be converted to an invert emulsion on pick-up of water from the formation.

In general, an oil-based drilling fluid requires the presence of a number of individual additives, each of which performs a separate function in the fluid. Thus, for example, an oil-base drilling fluid will normally require a suspending agent which may be a non-gelling organophilic colloid such as the product Petrotone, which is a trademarked product of the Baroid Division of National Lead Company. The function of the suspending agent is to suspend solids contained in the oil base drilling fluid, which solids may be weighting agents that are present to impart the desired specific gravity to the drilling fluid, or cuttings which are carried by the drilling fluid from the drill bit to a mud pit where the cuttings are removed.

A further ingredient which is commonly present in oil-base drilling fluids is a stabilizer, such as a nonionic phosphatide, one example of which is the trademarked product "Driltreat" sold by the Baroid Division of National Lead Company. The function of the stabilizer is to prevent adverse effects which can result from the pick-up of water by the oil base drilling fluid. Typically, these effects are a drastic increase in viscosity of the fluid, and the water wetting of solids which then may agglomerate and settle out.

Still other ingredients which are commonly present in an oil-base drilling fluid are a gelling agent such as a gel-forming organophilic colloid which gives body to an oil base drilling mud, e.g., Geltone, a trademarked product of the Baroid Division of National Lead Company, and an emulsifying agent for emulsifying water and oil.

The cost of the oil-base drilling fluid is, of course, dependent upon the cost of the various additives required in its formulation and its cost goes up in proportion to the number of required additives. Further, in compounding a suitable oil-base drilling fluid, it is necessary that the various additives be compatible with each other. As the number of required additives is increased, the possibilities for adverse interaction between the several additives in the drilling fluid is likewise increased. Thus, it would be very desirable if an oil-base drilling mud were devised which required the very minimum number of additives.

An object of the present invention is to provide oil-base drilling fluids and water-in-oil emulsion drilling fluids which require fewer additives than previous oil-base drilling fluids and water-in-oil emulsions.

A further object is to provide a method in which an oil base fluid or a water-in-oil emulsion is injected into a borehole in contact with a subsurface formation.

Additional objects will become apparent from the description and claims which follow.

In providing a solution to the various problems encountered with oil-base drilling fluids and water-in-oil emulsion drilling fluids of the prior art, I have provided oil-base fluids and water-in-oil emulsion drilling fluids which are far simpler in composition than the fluids of the prior art and which require fewer additives. In general, the oil-base fluids of my invention comprise a hydrocarbon oil, water in an amount ranging from 0 to in excess of about 50% by volume, an oil dispersible fluid loss control agent in an amount sufficient to produce an API fluid loss ranging from about 0 to about 5 ccs. and a selected quaternary ammonium salt of a specified cellulose sulfate in an effective amount which is sufficient to form an invert emulsion at a water content in excess of about 15% by volume. The content of the quaternary ammonium salt is also sufficient to produce a minimum apparent viscosity in an oil base fluid of about 5 cps. as measured on a Fann V-G meter at about 77° F. In addition, my drilling fluids and water-in-oil emulsions can contain an oil compatible weighting agent in order to maintain the specific gravity of the drilling fluid at any particular desired value. In the drilling of deep wells, it is necessary to maintain the specific gravity of the fluid at a level which is sufficient to prevent the seepage of fluids and gas into the well. A common type of weighting agent for use in an oil-base drilling fluid is calcium carbonate and another commonly used weighting agent is barite which is naturally occuring barium sulfate.

The oil which is present in my drilling fluids or water-in-oil emulsion drilling fluids is a hydrocarbon oil. The particular oil employed may vary widely and, for example, may include kerosene or a medium to high residue oil. A variety of oils which have been previously employed in oil base drilling fluids are set forth at page 567 of the text entitled "Composition and Properties of Oil Well Drilling Fluids" by Walter F. Rogers, 3rd Ed., Gulf Publishing Company, Houston, Tex. As listed, some of the oils which have been employed are crude oil; diesel oil; heavy refinery liquid residues; asphaltic crude; diesel or crude oil plus air blown asphalt; diesel or crude oil plus metallic soap; diesel or crude oil plus lampblack and asphalt; diesel oil plus air blown asphalt, tall oil, and sodium silicate, etc. Any of the various oils enumerated in the prior art may be employed as the oil base in formulating my novel drilling fluids.

In addition to the oil base material, my drilling fluids include a fluid loss agent which is present in an effective amount sufficient to produce an API fluid loss ranging from about 0 to 5 ccs., and preferably from about 0 to 1 cc. One example of an oil compatible fluid loss agent is oxidized asphalt or blown asphalt having, for example, a melting point in the order of 225° F. to about 310° F. as determined by the ring and ball method and a penetration in the order of about 6 to 20 at 77° F. A still further example of a fluid loss control agent is a heavy asphalt base crude oil or a refinery residuum having a viscosity in the range of about 16 to 24° API. Still other examples of oil compatible fluid loss agents are amine-treated clays such as an ammoniated bentonite.

A third ingredient which is present in my oil base drilling fluids is a selected quaternary ammonium salt of cellulose sulfate. These materials are new compositions in their own right and are described in my earlier filed applications.

The quaternary ammonium cellulose sulfate salts are derivatives of a colloidal cellulose sulfate having a degree of substitution (D.S.) of at least about 2, e.g., such as 1.8; having a viscosity in excess of 20 cps. at a 1% concentration in an aqueous media as measured by a Brookfield synchro electric viscometer, Model LVF, at 60 r.p.m. and a temperature of 25° C., and being further characterized as reactive with potassium ions in aqueous media to form a thermoreversible gel. The quaternary ammonium salt which is reacted with the colloidal cellulose sulfate contains four organic radicals attached to the nitrogen atom. The number of carbon atoms present in all of the organic substituent groups should total about 16 or more in order to impart suitable solubility characteristics to the resulting quaternary ammonium salt of the cellulose sulfate.

The reaction to form the quaternary ammonium cellulose sulfate salt is conducted in the presence of water and there is optionally present a lower alcohol. A preferred lower alcohol is methanol since it is quite miscible with water and is cheap and readily available. The reaction is generally conducted by dissolving in water, preferably at a pH of about 7 or higher, a water-soluble salt of the colloidal cellulose sulfate after which there is optionally added a lower alcohol followed by the addition of a quaternary ammonium salt. The reaction may be conducted at room temperature or higher temperatures such as about 50 to 70 degrees C. and preferably with agitation of the reaction mixture. The reaction goes almost instantaneously to give a nearly quantitative yield of the quaternary ammonium derivative of the colloidal cellulose sulfate. The product precipitates from the mother liquor and is removed and is then washed, and dried.

The colloidal cellulose sulfate reactant used in the reaction may be a water-soluble salt of cellulose sulfate, such as the sodium, ammonium, lithium, or potassium salt. The nature of the ion, such as sodium, which is present in the cellulose sulfate starting material can, of course, be varied so long as the cellulose sulfate salt is water soluble. The quaternary ammonium reactant is preferably a halogen salt, such as a chloride, bromide, or an iodide.

If desired, the quaternary ammonium salts of the colloidal cellulose sulfate may be formed by reaction of the free sulfuric acid ester of the colloidal cellulose sulfate rather than reaction of a water-soluble salt thereof. When the cellulose sulfate reactant is in the form of the free sulfuric acid ester, the quaternary ammonium ion is supplied by use of the corresponding quaternary ammonium hydroxide as a reactant.

Preferably, the quaternary ammonium salt or quaternary ammonium base, as the case may be, is employed in ammonium base, as the case may be, is employed in slight excess in forming the quaternary ammonium salt of a colloidal cellulose sulfate as described above. A molar excess of the quaternary ammonium reactant of 0.1 to 0.3 or greater has a tendency to drive the reaction to essential completion. This is desirable because the colloidal cellulose sulfate is the more expensive of the reactants. Completion of the reaction can be readily determined by visual observation of the mother liquor. As the quaternary ammonium cellulose sulfate product is formed, it coagulates and leaves the solution such that the remaining mother liquor becomes nearly clear and loses that portion of its viscosity which was contributed to it by the cellulose sulfate reactant. Further, the use of a slight molar excess of the quaternary ammonium reactant, e.g., 0.1 to 0.3, has, in general, been found to improve the solubility characteristics of the resulting products in a hydrocarbon oil as employed in the present invention.

Preparation of the essentially undergraded colloidal cellulose sulfate used in forming the above described quaternary ammonium cellulose sulfate salts is described in my earlier U.S. patent application Ser. No. 467,738, filed June 28, 1965. As there described, the colloidal cellulose sulfate is prepared by reaction of cellulose with a complex of sulfur trioxide and a lower N-dialkyl amide. The cellulose is presoaked prior to the sulfation reaction by the addition thereto of at least an equal weight of the same lower N-dialkyl amide. Preferably the N-dialkyl amide is dimethyl formamide, although there may also be used diethyl formamide, dimethyl acetamide, diethyl acetamide, and dimethyl propionamide. An excess of the N-dialkyl amide is preferably present in the sulfation complex in addition to the premixing of the cellulose with at least an equal amount by weight of the N-dialkyl amide used in preparing the complex.

In forming the essentially undegrated colloidal cellulose sulfate as described in U.S. patent application Ser. No. 467,738, the sulfation complex which contains sulfur trioxide and a lower N-dialkyl amide at a weight ratio of about 1 to 1 should be present in the reaction mixture in an amount which is about 1 to 8 times the weight of the cellulose. The term "cellulose" includes cellulose derived from various sources and in various forms, such as chemically treated cotton linters, cellulose derived from wood, etc.

In reaction of the sulfation complex with cellulose, as described above, a reaction temperature of about 0° to about 25° C. is suitable, and preferably the sulfation reaction is conducted at a temperature below about 15° C. The reaction time for relatively complete esterification can range from less than one hour up to several hours, depending upon the reaction temperature and the relative concentrations of the reactants.

One category of quaternary ammonium cellulose sulfate compounds which can be used in my invention is denoted (I) in which there are two long chains, i.e., from about $C_{10}$ to about $C_{18}$, alkyl groups attached to the nitrogen atom in addition to two methyl groups. Examples of such quaternary ammonium cellulose sulfates are dimethyl dilauryl ammonium cellulose sulfate, dimethyl distearyl ammonium cellulose sulfate, and compounds containing mixed long chain alkyl groups such as dimethyl di(mixed palmityl, myristyl and stearyl) ammonium cellulose sulfate which may also be called dimethyl di(hydrogenated tallow) ammonium cellulose sulfate. Still another example of a di(mixed alkyl) dimethyl ammonium cellulose sulfate is dimethyl di(tallow) ammonium cellulose sulfate in which the mixed long chain alkyl groups contain some degree of unsaturation.

A second category (II) of quaternary ammonium cellulose sulfates are those in which three methyl groups are bonded to the nitrogen atom, together with one long chain alkyl group, i.e., about $C_{14}$ to $C_{18}$.

Typical of such products are trimethyl tallow ammonium cellulose sulfate, trimethyl hydrogenated tallow ammonium cellulose sulfate, trimethyl stearyl ammonium cellulose sulfate, and trimethyl tall oil ammonium cellulose sulfate.

Still other categories of quaternary ammonium cellulose sulfates are (III) dimethyl monoalkyl (about $C_{12}$–$C_{18}$) monoaromatic ammonium cellulose sulfates; (IV) diaromatic monoalkyl (about $C_{12}$–about $C_{18}$) methyl ammonium cellulose sulfates, and (V) methyl trialkyl (about $C_8$–about $C_{18}$) ammonium cellulose sulfates. An example of a product in category (III) is dimethyl phenyl stearyl ammonium cellulose sulfate, while an example of a material in category (IV) is methyl diphenyl stearyl ammonium cellulose sulfate. An example of a material in category (IV) is methyl tricaprylyl ammonium cellulose sulfate. Of the quaternary ammonium cellulose sulfates defined above, the materials in categories (I), (IV) and (V) are preferred for use in the present invention.

The aromatic groups present in the compounds denoted (IV) above are monocyclic aromatic hydrocarbon groups containing from 6 to about 18 carbon atoms. Typical of such groups are phenyl, stearylphenyl, laurylphenyl and dimethylphenyl groups.

A solvent soluble cellulose sulfate compound or a mixture of such compounds, as described above, is present in my oil base drilling fluids at concentrations ranging from about 0.03 to 5.0 percent by weight. Preferably, the concentration of the quaternary ammonium cellulose sulfate ranges from about one-quarter to about five pounds per barrel of oil, or a weight concentration of about 0.09% to about 1.8%. Surprisingly, I have found that within this concentration range, the use of a selected quaternary ammonium salt or cellulose sulfate or a mixture of such salts, as defined above, performs functions which previously required the use of three separate additives. The quaternary ammonium salt of cellulose sulfate provides suspension of the solid ingredients contained in the oil base drilling fluid, it increases the viscosity of the oil base fluid, it imparts the proper over-all rheology to the drilling fluid, and lastly, it provides excellent emulsification of water-in-oil to form stable invert emulsions. The rheology imparted to the oil-base drilling fluid by the use of the quaternary ammonium salt of cellulose sulfate, as defined above, is pseudoplastic, which means that the viscosity of the drilling fluid changes instantaneously with respect to the shear imposed on the drilling fluid.

Most materials have viscosities which are Newtonian, i.e., in which the viscosity remains the same and does not vary with the shear forces imposed on the liquid. In the case of liquids, such as the oil base drilling fluids of my invention, which have a pseudoplastic viscosity, the viscosity of the liquid is instantaneously reduced when the liquid is subjected to shear and is instantaneously increased when the shear forces are removed. Such viscosity characteristics are very desirable for a drilling fluid which, during use, is circulated in a closed path from a mud pit to a pump which pumps it down the drill pipe to the drill bit from which it is returned to the mud pit. In passing through the pump, the drilling fluid is subjected to high shear forces. Due to the pseudoplastic characteristics of my drilling fluids, their viscosities drop instantaneously at this point, which makes them easier to pump. Subsequently, when the drilling fluid is returned from the drill bit, where it has picked up cuttings, the viscosity of the drilling fluid is increased since it is undergoing less shear which aids in suspending the solid materials contained in the drilling fluid.

If, in the drilling of the well, it should become necessary to shut down the pump, the circulation of the drilling fluid would cease altogether and its viscosity would increase even further since it would not be subjected to any shear forces. Since the drilling fluid contains cuttings and may also contain solid weighting materials, it is very desirable that the fluid increase in viscosity when its circulation ceases, or otherwise the solid particles would drop out of the fluid and settle to the bottom of the drill pipe. This could require their removal by mechanical means, such as redrilling this portion of the well.

As stated previously, an important function which is performed by the quaternary ammonium cellulose sulfate is to act as an emulsifying agent in emulsifying water in oil. As my oil base drilling fluid is used, it will have a tendency to pick up water from the formation. If this water is not emulsified in the form of a water-in-oil emulsion in which the oil is the continuous phase, the presence of the water would tend to destroy the effectiveness of the oil base drilling fluid. For example, the water could hydrate water sensitive clays which could drastically alter the characteristics of the drilling fluid. However, when the water picked up by the oil base drilling fluid is emulsified in the form of a water-in-oil emulsion, the characteristics of the emulsion are determined primarily by the continuous oil phase. In this form, the water does not have the undesirable effect on the properties of the drilling fluid, which would result if the water formed in oil-in-water emulsion with the fluid or if the water were not emulsified at all.

In many instances, it may be desirable to employ my drilling fluids in the form of an invert emulsion in which water is deliberately mixed with the oil base drilling fluid. The use of a relatively large volume of water in the fluid reduces its costs since water is, of course, cheaper than the oil. Further, it has been found that the presence of water in the water-in-oil emulsion increases the viscosity of the overall fluid. This may be advantageous in permitting the use of a reduced quantity of the quaternary ammonium salt of cellulose sulfate, as described above.

The dividing line between an oil base drilling fluid containing some water and an invert emulsion is somewhat arbitrary since, in the case of my drilling fluids, any water which is present will be emulsified in the form of a water-in-oil emulsion. By definition, an oil base drilling fluid containing less than about 15% by volume of water will be termed an oil base drilling fluid and at water concentrations of about 15% by volume and above, the fluid will be termed an invert emulsion.

A major problem which has been previously encountered in the use of invert emulsion drilling fluids pertains to their stability. With conventional water-in-oil emulsions, the fluid continues to pick up water until it reaches a point where it cannot hold the additional water in the form of the emulsion. At this point, the emulsion flips and reverts to an oil-in-water emulsion. This is very undesirable in terms of a drilling operation since the solubility characteristics of the various ingredients in the emulsion drilling fluid are drastically altered when the emulsion flips. To illustrate, the various additives in a water-in-oil emulsion are organophilic such that they are soluble in the continuous oil phase. However, when the emulsion flips, the continuous phase becomes the water phase and the organophilic additives, being insoluble in this phase, may be precipitated from the emulsion.

Surprisingly, I have found that invert emulsion drilling fluids of my invention do not flip or revert to an oil-in-water emulsion when the water content is increased to an amount in excess of that which can be held by the emulsion. The maximum quantity of water which can be retained in my emulsion drilling fluids in the form of a water-in-oil emulsion may vary somewhat depending upon the particular quaternary ammonium salt of cellulose sulfate which is employed. In general, however, the maximum amount of water which can be held in the form of a water-in-oil emulsion will be in excess of 50% by volume. When the maximum amount of water is exceeded, the water is not taken up by the emulsion but remains as a separate phase. However, the emulsion retains its stability and does not flip or revert to an oil-in-water emulsion at this point. This is quite important since it indicates that the invert emulsion drilling fluids of my invention have a very high stability. Thus, when the amount of water present exceeds that which can be retained in the form of an emulsion, the emulsion does not lose its desirable properties such that the solubility of the various ingredients in the emulsion would be drastically altered.

As stated above, it has been found that the viscosity of an invert emulsion drilling fluid of my invention increases as the water content of the emulsion is increased. This could create extreme problems if it were not for the fact that the invert emulsions of my invention have pseudoplastic viscosity characteristics, due to the presence of the quaternary ammonium salts of cellulose sulfate which I employ. By virtue of their pseudoplastic viscosity characteristics, my invert emulsion drilling fluids can become quite viscous in terms of their apparent viscosity and yet still be pumpable and usable as drilling fluids. If the viscosity characteristics of my invert emulsion drilling fluids were not pseudoplastic, the water content of the invert emulsion would have to be very carefully controlled in order not to exceed the limiting viscosity at which the fluid could be pumped and circulated in the well bore.

In the use of invert emulsion drilling fluids of my invention, it is desirable to maintain a proper balance between the oil content, the water content and the concentration of the quaternary ammonium salt of cellulose sulfate in the overall system. By way of example, as the water content of the invert emulsion is increased, the oil content of the emulsion and the concentration of the quaternary ammonium salt of cellulose sulfate, as defined above, will be decreased. As the water content of the invert emulsion is increased, the apparent viscosity of the system (defined as the viscosity of the fluid in centipoises measured at a shear rate of 1022 reciprocal seconds) will be increased. If it is desired to reduce the apparent viscosity, this can be accomplished simply by adding oil to the system which increases the volume percent of oil while decreasing the volume percent of water. Any increase in either the oil content or water content of the emulsion will, of course, result in reducing the concentration of the quaternary ammonium salt of cellulose sulfate in the emulsion.

Since the apparent viscosity of the invert emulsion is dependent not only on the water content of the emulsion, but also on the concentration of the quaternary ammonium salt of cellulose sulfate, an additional factor governing viscosity is the concentration of the quaternary ammonium salt of cellulose sulfate present in the system. If, for example, the concentration of the quaternary ammonium salt of cellulose sulfate was originally 1½ pounds per barrel of oil, an emulsion formed by adding 40% by volume of water would have a higher viscosity than an emulsion formed by adding 40% by volume of water to an oil base fluid containing only one pound of the same quaternary ammonium salt of cellulose sulfate per barrel of oil.

In demonstrating the properties of my oil base drilling fluids, several drilling fluids were prepared by dissolving varying quantities of a given quaternary ammonium salt of cellulose sulfate in the oil. The salt was formed by reacting a quaternary ammonium halide in which the ammonium group is dimethyl di($C_{14}$–$C_{18}$ alkyl) ammonium with a sodium cellulose sulfate having a degree of substitution in excess of 1.8 and a viscosity at a concentration of 1% aqueous solution of at least 20 cps. The molar ratio of the reactant quaternary ammonium compound (Aliquat H–226 supplied by General Mills Company) to the sodium cellulose sulfate reactant was about 1.3:1.

Varying amounts of the quaternary ammonium salt of cellulose sulfate, as defined above, were dissolved in No. 2 diesel oil using a Hamilton Beach mixer. The mixing time was about 30 minutes. Typical test results are shown in the following Table I in which the concentration of the quaternary ammonium salt of cellulose sulfate in the oil is set forth in column 1, the apparent viscosity of the fluid is set forth in column 2, the plastic viscosity of the fluid is set forth in column 3 and the yield point of the fluid is set forth in column 4. The viscosity measurements were made with a Fann V-G meter.

As described previously, the apparent viscosity (AV) in centipoises is measured at a shear rate of 1022 reciprocal seconds. The plastic viscosity (PV) in centipoises is equal to twice the apparent viscosity (AV) minus the viscosity measured at a shear rate of 511 reciprocal seconds. For Newtonian fluids, the plastic viscosity and the apparent viscosity are the same. For pseudoplastic liquids, however, the plastic viscosity is less than the apparent viscosity. The yield point (YP) is the theoretical force necessary to shear a fluid if it behaves as a Bingham plastic and is determined from the equation $$(YP = 2\ AV - 2\ PV)$$

The values of the yield point are expressed in pounds per 100 square feet.

TABLE I

| Concentration, lb./bbl. | AV (cps.) | PV (cps.) | YP (lb./100 ft.²) |
|---|---|---|---|
| 1 | 8 | 5 | 6 |
| 2 | 17 | 9 | 16 |
| 4 | 23 | 11 | 24 |

As shown in the above table, all of the above drilling fluids were pseudoplastic since their plastic viscosities were considerably less than their apparent viscosities.

In further tests, the drilling fluid described in Table I which contained 2 lbs. of the quaternary ammonium salt of cellulose sulfate per barrel of oil was found to have a Marsh funnel viscosity of 48 seconds. Seven and one-half pounds of this drilling fluid (1 gallon) were weighted with barite to a weight of 11.5 lbs. after which the fluid was subjected to temperatures of 250° F. No settling or viscosity change was observed following the treatment at 250° F.

The oil base drilling fluids described in Table I require the addition of an additive in order to control filtrate loss. On the addition of an amine treated bentonite, the API filtrate loss of the fluids described in Table I was reduced from in excess of 50 ccs. to 7 ccs. The API fluid loss was determined by use of a standard test procedure using a Baroid low pressure filter press. The results of the API fluid loss test are reported in cubic centimeters of filtrate passing through the filter press during a 30-minute test period.

The Marsh funnel viscosity test, referred to above, is a standard means of determining viscosity of drilling fluids. The Marsh funnel testing procedure is described at pages 126 and 127 of the text "Composition and Properties of Oil Well Drilling Fluids" by Walter F. Rogers, 3rd Ed., Gulf Publishing Company, Houston, Tex. The viscosity measurement employing the Marsh funnel test is reported in seconds and is the time required for 946 ccs. of the drilling fluid to flow from a Marsh funnel containing 150 ccs. of the drilling fluid.

In further tests, a number of invert emulsion fluids were prepared by adding the quaternary ammonium salt of cellulose sulfate employed in the fluids of Table I to a 50:50 volume mixture of water and No. 2 diesel oil. After 3 minutes of mixing, the systems would not conduct a current, which indicated that complete inversion had occurred, i.e., the oil phase had become continuous. In addition, the systems were tested and found to be stable to an applied potential in excess of 100 volts.

My invert emulsion drilling fluids may be prepared by using either fresh water or salt water. Surprisingly, the API fluid loss of an emulsion drilling fluid of my invention is reduced as the salt content of the water used in preparing the emulsion is increased. This permits a reduction in the concentration of the fluid loss control agent as the salt content of the water in the emulsion is increased.

It was also found that the use of a highly saturated brine in the preparation of a water-in-oil emulsion requires the use of somewhat larger quantities of the quaternary ammonium salt of cellulose sulfate in order to attain a stable water-in-oil emulsion. The use of a saturated brine as a water source in drilling is necessary in some areas such as the Permian Basin in Wyoming where the water is saturated with salts. By way of illustration, sea water contains about 3½ to 4% by weight of sodium chloride while the saturation point of sodium chloride in water is about 25% by weight.

To demonstrate the effect of salt on an invert emulsion drilling fluid, test data was obtained as shown in the following Table II, in which column 1 indicates the concentration of the quaternary ammonium salt of cellulose sulfate (the same salt is employed as in Table I) while column 2 indicates the type of water employed, column 3 indicates the apparent viscosity, column 4 the plastic viscosity, column 5 the yield point, and column 6 the API fluid loss in cubic centimeters of filtrate. The fluid loss was determined by a standard test procedure using a low pressure Baroid filter press.

TABLE II

| Concentration, lb./bbl. | Water type | AV (cps.) | PV (cps.) | YP (lb./100 ft.) | API (cc.) |
|---|---|---|---|---|---|
| 1 | Fresh | 82 | 70 | 24 | >50 |
| 2 | Sat'd NaCl | 45 | 24 | 42 | 7 |
| 2 | Permian brine | 45 | 24 | 42 | 7 |

As shown in Table II, the invert emulsions which contained 50 volume percent of the saturated sodium chloride and 50 volume percent of the Permian Brine were somewhat more pseudoplastic than the emulsion prepared from fresh water. This is indicated by the considerable difference between the plastic viscosity and the apparent viscosity for each of these invert emulsions. In addition, the emulsion drilling fluids which were made up by using either a saturated sodium chloride solution or a Permian brine had a much lower fluid loss than the emulsion prepared with fresh water. As illustrated, the use of water having a high salt content acts to control fluid loss such that the use of a fluid loss control agent may be reduced or in some cases eliminated.

To further illustrate my invention, there are presented the following examples in which all parts and percentages are by weight unlesse otherwise indicated.

EXAMPLE I

An invert emulsion drilling fluid was prepared by mixing 63 grams of sodium chloride, 2 grams of the quaternary ammonium cellulose sulfate employed in Table I and a 50–50 volume mixture of No. 2 diesel oil with water in an amount sufficient to give a total volume of 350 milliliters. The mixture was stirred for about 45 minutes in a Hamilton Beach mixer to give an invert emulsion having an apparent viscosity of 41 cps., a plastic viscosity of 22 cps., a yield point of 40 lbs. per 100 square feet, and an API fluid loss of 3 cps.

EXAMPLE II

An invert emulsion drilling fluid was prepared by mixing 63 grams of sodium chloride, 2 grams of the quaternary ammonium cellulose sulfate employed in Table I, 10.5 grams of bentonite, and a 50–50 volume mixture of kerosene with water in an amount to give a test sample of 350 milliliters. In preparing the invert emulsion drilling fluid, the above mixture was stirred for 45 minutes in a Hamilton Beach mixer and was thereafter found to have an apparent viscosity of 48 cps., a plastic viscosity of 25 cps., a yield point of 40 lbs. per hundred square feet, and an API fluid loss of 0 cc.

EXAMPLE III

An invert emulsion type drilling fluid was prepared by stirring in a Hamilton Beach mixer for about 45 minutes a mixture comprising 2 grams of the quaternary ammonium cellulose sulfate employed in Table I, 4.0 grams of a gel-forming organophilic colloid (the product Geltone supplied by Baroid Division of National Lead Company), and a 50–50 volume mixture of kerosene and water to give a sample volume of 350 milliliters. The invert emulsion drilling fluid which resulted had an apparent viscosity of 95 cps., a plastic viscosity of 50 cps., a yield point of 90 lbs. per 100 square feet, and an API fluid loss of 0 cc.

Example III was repeated with the exception that only 2.0 grams of Geltone were employed, and the resulting invert emulsion drilling fluid had an apparent viscosity of 85 cps., a plastic viscosity of 50 cps., and a yield point of 70 lbs. per 100 square feet. When Example III was repeated using only 0.5 gram of Geltone, the resulting invert emulsion had an apparent viscosity of 63 cps., a plastic viscosity of 40 cps. and a yield point of 26 lbs. per 100 square feet. In a still further experiment where Example III was repeated using 2 grams of Geltone and 1.0 gram of the quaternary ammonium cellulose sulfate, the resulting emulsion had and apparent viscosity of 50 cps., a plastic viscosity of 30 cps., and a yield point of 40 lbs. per 100 square feet.

EXAMPLE IV

A mixture was prepared which contained 2.0 grams of the quaternary ammonium cellulose sulfate employed in Table I, 0.5 gram of an organophilic colloid (the product Geltone supplied by Baroid Division of National Lead Company), and a 50–50 volume mixture of No. 2 diesel oil with water in an amount sufficient to give a total volume of 350 milliliters. After stirring for about 45 minutes in a Hamilton Beach mixer, the resulting invert emulsion had an apparent viscosity of 80 cps., a plastic viscosity of 60 cps., and a yield point of 40 lbs. per 100 square feet.

When Example IV was repeated using 1.0 gram of the quaternary ammonium cellulose sulfate, and 2.0 grams of Geltone, the resulting invert emulsion had an apparent viscosity of 74 cps., a plastic viscosity of 50 cps., and a yield point of 48 lbs, per 100 square feet.

EXAMPLE V

An oil base drilling fluid was prepared by mixing 2.0 grams of a quaternary ammonium cellulose sulfate as employed in Table I, 4.0 grams of ammoniated bentonite, and kerosene in an amount sufficient to give a total volume of 350 milliliters. The resulting fluid had an apparent viscosity of 12 cps., a plastic viscosity of 4 cps., and a yield point of 16 lbs. per 100 square feet.

Example V was repeated using No. 2 diesel oil in lieu of the kerosene, and the resulting fluid had an apparent viscosity of 15 cps., a plastic viscosity of 7 cps., and a yield point of 16 lbs. per 100 square feet.

In still further tests, fluids were prepared which contained either No. 2 diesel oil or kerosene in admixture with the quarternary ammonium cellulose sulfate, as described previously, and an organophilic colloid such as the product Geltone supplied by the Baroid Division of National Lead Company. These fluids were found to have pseudoplastic viscosity characteristics in that their plastic viscosities were less than their apparent viscosities.

In still further tests, a number of invert emulsions were prepared which contained varying concentrations of a quaternary ammonium cellulose sulfate as described previously. Each of the emulsions contained at 50–50 volume mixture of No. 2 diesel oil with water saturated with sodium chloride. The emulsion stability of the various emulsions, as set forth in the following Table III, shows the concentration of quaternary ammonium cellulose sulfate compound in which the ammonium group contains 2 methyl groups, and 2 alkyl groups each having from about 14 to 18 carbon atoms. The sodium cellulose sulfate reactant employed for forming the quaternary ammonium compound had a degree of substitution in excess of 1.8 and a viscosity at a concentration of 1% by weight in aqueous solution of at least 20 cps. The molar ratio of the reactant quaternary ammonium compound (Aliquat H–226 supplied by General Mills Company) to the sodium cellulose sulfate reactant was about 1.3:1. The concentration of the quaternary ammonium cellulose sulfate is set forth in column 1 of the table, the breakdown voltage of the emulsion is set forth in column 2 of the table, the apparent viscosity in centipoises in column 3, the plastic viscosity in centipoises in column 4 and the yield point in pounds per 100 square feet is set forth in column 5. In the preparation of all of these emulsions, the ingredients were mixed rapidly until the invert emulsion was formed.

TABLE III

| Concentration (lb./bbl.)[1] | Breakdown voltage, v. | Apparent viscosity, cps. | Plastic viscosity, cps. | Yield point, lb./100 ft.[2] |
| --- | --- | --- | --- | --- |
| 0.50 | 42 | 16 | 13 | 6 |
| 0.75 | 55 | 18 | 12 | 12 |
| 1.00 | 65 | 19 | 13 | 12 |
| 2.00 | 220 | 20 | 13 | 14 |
| 4.00 | >540 | 26 | 16 | 20 |

[1] Concentration based on total emulsion weight.

In still further tests, it was found that invert emulsions containing a 50–50 volume mixture of No. 2 diesel oil with water saturated with sodium chloride and a concentration of quaternary ammonium cellulose sulfate as employed in Table I of 2 and 4 lbs. per barrel each had an API fluid loss of less than 3 ccs.

As demonstrated by the foregoing data, my invention provides a variety of oil-base drilling fluids and water-in-oil emulsion drilling fluids, each of which is relatively simple in its composition as compared with corresponding fluids of the prior art. In addition, each of the drilling fluids of my invention has a pseudo-plastic viscosity such that the viscosity of the fluid varies inversely with respect to shear. The viscosity of the fluid changes instantaneously with respect to shear and, as a result, the fluids of my invention have relatively high viscosities under low shear conditions such that they can suspend and transport the cuttings contained in the fluid. At the same time, my fluids have a relatively low viscosity under conditions of high shear as encountered in the pump which circulates the drilling fluid.

Since the solubility of the quaternary ammonium cellulose sulfate in the oil wall vary depending upon the temperature of the oil, it may be desirable in some cases to form a presolution of the quaternary ammonium cellulose sulfate in the oil before forming the oil base drilling fluid or oil-in-water emulsion. Presolution of the quaternary ammonium cellulose sulfate in the oil, could, for example, be carried out at the refienery at elevated temperatures which would assist in forming the solution. The material thus formed could then be shipped to the drilling site and be used for making up oil base drilling fluids or water-in-oil emulsion drilling fluids.

As discussed previously, the dividing line between oil based drilling fluids and water-in-oil emulsion drilling fluids is somewhat arbitrary in terms of the present invention. In drilling an oil well, the driller may, for example, begin the drilling operation by simply using a crude oil having a viscosity, for example, of 5 cps. As the drilling proceeds, the driller may then add a quaternary ammonium cellulose sulfate, as described previously, to increase the viscosity of the fluid, for example, to 10 cps. As the drilling proceeds, the oil based fluid may pick up water which will result in a further increase in its viscosity and as the water content increases above about 15%, an invert emulsion drilling fluid will be formed. This demonstrates the manner in which the drilling fluid may be altered during the drilling operation by the driller in using my invention.

Having defined my invention in the foregoing specification and claims, I desire to be limited only by the lawful scope of the appended claims.

I claim:

1. An oil base drilling fluid consisting essentially of a hydrocarbon oil, an oil-dispersible fluid loss control agent in an amount sufficient to produce an API fluid loss ranging from about 0 to about 5 ccs. and a quaternary ammonium salt of an essentially undegraded colloidal cellulose sulfate having a D.S. of about 2.0 or higher, said cellulose sulfate having a viscosity of 20 cps. or higher at a 1% concentration in an aqueous media as measured by a Brookfield synchro electric viscometer, Model LVF, at 60 r.p.m. and a temperature of 25° C., said cellulose sulfate being further characterized as reactive with potassium ions in aqueous media to form a thermoreversible gel, the quaternary ammonium group of said salt containing:
(I) two long-chain alkyl groups each having from about 10 to about 18 carbon atoms, and two methyl groups;
(II) three methyl groups together with one long chain alkyl group, having 14–18 carbon atoms;
(III) two methyl groups, one alkyl group having 12–18 carbon atoms and one monocyclic aromatic hydrocarbon group having 6 to 18 carbon atoms;
(IV) two monocyclic aromatic hydrocarbon groups with each of said aromatic groups containing from 6 to 18 carbon atoms, and one methyl group; or
(V) one methyl group and three long-chain alkyl groups with each of said alkyl groups containing from 8 to about 18 carbon atoms, and
said quaternary ammonium salt of cellulose sulfate being present in an effective amount ranging from about 0.03 to about 5% by weight, which is at least sufficient to produce a minimum apparent viscosity in said oil base fluid of about 5 cps. as measured on a Fann V-G meter at about 77° F.

2. The oil-base drilling fluid of claim 1 including water in an amount sufficient to form an invert emulsion.

3. The oil base fluid of claim 1 containing an oil compatible weighting agent.

4. The oil base fluid of claim 1 wherein said quarternary ammonium cellulose sulfate salt contains a molar excess of quaternary ammonium ion sufficient to improve its solubility characteristics in a hydrocarbon oil.

5. The oil base fluid of claim 1 wherein said quaternary ammonium cellulose sulfate is dimethyl di(hydrogenated tallow) ammonium cellulose sulfate.

6. The oil base drilling fluid of claim 1 including water in an amount up to about 15% by weight.

7. The fluid of claim 6 wherein said water contains salt.

8. An invert emulsion drilling fluid consisting essentially of a hydrocarbon oil, water in an amount of about 15% by weight or more, an oil-dispersible fluid loss control agent in an amount sufficient to produce an API fluid loss ranging from about 0 to about 5 ccs. and a quaternary ammonium salt of an essentially undegraded colloidal cellulose sulfate having a D.S. of about 2.0 or higher, said cellulose sulfate having a viscosity of 20 cps. or higher at a 1% concentration in an aqueous media as measured by a Brookfield synchro electric viscometer, Model LVF, at 60 r.p.m. and a temperature of 25° C., said cellulose sulfate being further characterized as reactive with potassium ions in aqueous media to form a thermoreversible gel, the quaternary ammonium group of said salt containing:
(I) two long-chain alkyl groups each having from about 10 to about 18 carbon atoms, and two methyl groups;
(II) three methyl groups together with one long chain alkyl group, having 14–18 carbon atoms;
(III) two methyl groups, one alkyl group having 12–18 carbon atoms and one monocyclic aromatic hydrocarbon group having 6 to 18 carbon atoms;
(IV) two monocyclic aromatic hydrocarbon groups with each of said aromatic groups containing from 6 to 18 carbon atoms, one long-chain alkyl group containing from 12 to 18 carbon atoms, and one methyl group; or
(V) one methyl group and three long-chain alkyl groups with each of said alkyl groups containing from 8 to about 18 carbon atoms, and said quaternary ammonium salt of cellulose sulfate being present in an effective amount of about 0.09% to about 1.8% which is at least sufficient to form an invert emulsion.

9. The invert emulsion of claim 8 wherein said water contains salt.

10. A method for drilling a well, said method consisting essentially of injecting the oil base drilling fluid defined in claim 1 into a bore hole, and circulating said drilling fluid within said bore hole in contact with a drill bit and the underground formation.

11. A method for drilling a well, said method consisting essentially of injecting the oil base drilling fluid defined in claim 8 into a bore hole, and circulating said drilling fluid within said bore hole in contact with a drill bit and the underground formation.

References Cited

UNITED STATES PATENTS

| | | |
|---|---|---|
| 2,675,353 | 4/1954 | Dawson _____ 252—8.5 |
| 2,816,073 | 12/1957 | Stratton _____ 252—8.5 |
| 2,931,753 | 4/1960 | Chesbro et al. |
| 3,168,475 | 2/1965 | Jordan et al. _____ 252—8.5 |
| 3,337,531 | 8/1967 | Wakeman et al. _____ 260—215 |
| 3,368,484 | 2/1968 | Fairchild _____ 101—463 |

HERBERT B. GUYNN, Primary Examiner

U.S. Cl. X.R.

252—8.5 P, 308, 355; 260—215